(12) United States Patent
Hatano

(10) Patent No.: US 8,231,181 B2
(45) Date of Patent: Jul. 31, 2012

(54) BRAKE SYSTEM

(75) Inventor: Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/316,260

(22) Filed: Dec. 10, 2008

(65) Prior Publication Data

US 2009/0179483 A1 Jul. 16, 2009

(30) Foreign Application Priority Data

Jan. 10, 2008 (JP) ................................. 2008-002708
Jan. 10, 2008 (JP) ................................. 2008-002863

(51) Int. Cl.
*B60T 13/74* (2006.01)

(52) U.S. Cl. .......... 303/3; 303/9.69; 303/13; 303/114.1; 303/115.2; 303/116.1; 303/117.1; 303/119.2; 60/545; 60/549; 60/561; 60/562; 188/345; 188/349; 188/561; 188/562

(58) Field of Classification Search ............... 303/116.1, 303/3, 114.1, 115.1, 115.2, 155, 115.4, 20, 303/113.5; 60/545, 567, 582; 188/345
See application file for complete search history.

(56) References Cited

U.S. PATENT DOCUMENTS

| 2,174,615 | A | | 10/1939 | Bowen et al. |
| 3,512,361 | A | * | 5/1970 | McCaffery ....................... 60/549 |
| 4,526,426 | A | * | 7/1985 | Sato et al. .................... 303/9.69 |
| 5,098,171 | A | | 3/1992 | Siegel |
| 5,273,348 | A | * | 12/1993 | Yagi et al. ....................... 303/13 |
| 5,713,640 | A | * | 2/1998 | Feigel et al. ................ 303/115.2 |
| 6,033,036 | A | | 3/2000 | Ruffer et al. |
| 6,183,049 | B1 | * | 2/2001 | Oka et al. .................... 303/114.1 |
| 2002/0084693 | A1 | * | 7/2002 | Isono et al. ................ 303/113.1 |
| 2005/0236892 | A1 | | 10/2005 | Kusano |
| 2007/0278855 | A1 | * | 12/2007 | Hatano ....................... 303/116.1 |
| 2008/0079309 | A1 | | 4/2008 | Hatano et al. |

FOREIGN PATENT DOCUMENTS

| JP | 49-100082 | | 8/1974 |
| JP | 2-258458 | A | 10/1990 |
| JP | 3-295747 | A | 12/1991 |
| JP | 4-252766 | A | 9/1992 |

(Continued)

*Primary Examiner* — Robert A Siconolfi
*Assistant Examiner* — San Aung
(74) *Attorney, Agent, or Firm* — Carrier Blackman & Associates, P.C.; William D. Blackman; Joseph P. Carrier

(57) ABSTRACT

In a brake system including a master cylinder and an electrically-driven hydraulic pressure generator with front and rear pistons, when the hydraulic pressure generator cannot be operated and a failure of a first hydraulic system linked to a rear fluid chamber of the generator occurs and makes a first hydraulic system open to the atmosphere, the brake-fluid pressure of a second hydraulic system transmitted from the master cylinder to a wheel cylinder via a front fluid chamber of the generator is used to perform braking. A forward-facing third front cup seal provided at an intermediate portion of the front piston prevents the brake-fluid pressure generated by the master cylinder from leaking out from a front supply port via the rear fluid chamber. At the same time, a stopper prevents the pressure of the front fluid chamber from moving the front piston excessively backward. The braking is accordingly secured by use of the second hydraulic system linked to the front fluid chamber of the motor cylinder.

7 Claims, 8 Drawing Sheets

FOREIGN PATENT DOCUMENTS

| | | |
|---|---|---|
| JP | 9-175360 A | 7/1997 |
| JP | 11-512055 A | 10/1999 |
| JP | 2003-137084 A | 5/2003 |
| JP | 2005-186734 A | 7/2005 |
| JP | 2005-313704 A | 11/2005 |
| JP | 2006-056449 A | 3/2006 |
| JP | 2007-160992 A | 6/2007 |
| JP | 2007-326395 | 12/2007 |

* cited by examiner

BRAKE SYSTEM

CROSS-REFERENCE TO RELATED APPLICATIONS

The present invention claims priority under 35 USC §119 based on Japanese patent application Nos. 2008-2708 and 2008-2863, both filed 10 Jan. 2008. The subject matter of these priority documents is incorporated by reference herein.

BACKGROUND OF THE INVENTION

1. Field of the Invention

The present invention relates to a brake system provided with: a master cylinder for generating brake-fluid pressure based on a braking operation of a driver; and a hydraulic pressure generator which generates brake-fluid pressure by use of an electrically-controllable actuator.

2. Description of the Related Art

Japanese Patent Application Laid-Open No. 2003-137084 discloses what is known as a Brake-by-Wire (BBW) brake system. In the BBW brake system, a braking operation of a driver is converted into an electric signal to actuate a device for electrically generating hydraulic pressure, and the brake-fluid pressure generated by this device actuates the wheel cylinders.

In the BBW brake system of this kind, when a failure of the device for electrically generating hydraulic pressure occurs, the fail-safe function is activated, in which the brake-fluid pressure generated by a master cylinder is transmitted directly to the wheel cylinders, thereby braking the wheels. In addition, the BBW brake system employs a tandem type master cylinder, which supplies the brake-fluid pressure individually to two separate hydraulic systems. Thus, even when leakage occurs in one of the two hydraulic systems, the other hydraulic system can brake some of the wheels.

FIG. 4 shows a relevant portion of the structure of a conventional device for electrically generating hydraulic pressure (a motor cylinder 123). Inside a cylinder main body 136, a rear piston 138A and a front piston 138B are disposed free to slide, with a pair of return springs 137A and 137B provided to bias the respective rear piston 138A and the front piston 138B in the backward direction. A rear fluid chamber 139A is formed at the front of the rear piston 138A while a front fluid chamber 139B is formed at the front of the front piston 138B.

A rear reservoir chamber 138a is formed in the outer circumferential surface of the rear piston 138A for the purpose of preventing the air from entering the rear fluid chamber 139A, and a front reservoir chamber 138b is formed in the outer circumferential surface of the front piston 138B for the purpose of preventing the air from entering the front fluid chamber 139B. A rear inlet port 140A of the rear fluid chamber 139A and a rear supply port 149A of the rear reservoir chamber 138a are connected to the master cylinder, and a rear outlet port 141A of the rear fluid chamber 139A is connected to wheel cylinders. In addition, a front inlet port 140B of the front fluid chamber 139B and a front supply port 149B of the front reservoir chamber 138b are connected to the master cylinder. A front outlet port 141B of the front fluid chamber 139B is connected to the other wheel cylinders.

A first rear cup seal C1 is provided to the front end portion of the rear piston 138A so as to face forward (i.e., so as to produce its sealing effects when the rear piston 138A moves forward), and a second rear cup seal C2 is provided to the rear end portion of the rear piston 138A so as to face forward. A first front cup seal C3 is provided to the front end portion of the front piston 138B so as to face forward, and a second front cup seal C4 is provided to the rear end portion of the front piston 138B so as to face backward (i.e., so as to produce its sealing effects when the front piston 138B moves backward).

Assume a hypothetical case where a failure of the conventional motor cylinder 123 occurs, and the wheel cylinders are to be actuated by the brake-fluid pressure generated by the master cylinder. Here, in the above-described structure of the motor cylinder 123, the front supply port 149B is connected to the master cylinder. Accordingly, if a failure of the first hydraulic system occurs, the rear fluid chamber 139A of the motor cylinder 123 comes to be open to the atmosphere. This in turn causes leakage of the brake-fluid pressure generated by the master cylinder, in the course from the front supply port 149B to the rear fluid chamber 139A via the front reservoir chamber 138b and the second front cup seal C4, possibly causing a failure of the second hydraulic system linked to the front fluid chamber 139B.

SUMMARY OF THE INVENTION

The present invention has been made in light of the above-described circumstances, and thus has an object of providing a BBW brake system with two hydraulic systems in which, in the case of a failure of one of the two hydraulic systems, the other hydraulic system functions reliably.

In order to achieve the object, according to a first feature and aspect of the present invention, there is provided a brake system comprising: a master cylinder which generates brake-fluid pressure in response to a braking operation of a driver; an electrically-driven hydraulic pressure generator which communicates with the master cylinder, includes a rear fluid chamber and a front fluid chamber, and generates brake-fluid pressure when driven by an electrically-controllable actuator; and a plurality of wheel cylinders which communicate with the rear fluid chamber and the front fluid chamber, respectively, and which generate a braking force to brake wheels, wherein brake-fluid pressure generated by the master cylinder is used, at the time of a failure of the hydraulic pressure generator, to actuate the wheel cylinders, and wherein the hydraulic pressure generator includes: a rear piston and a front piston which are moved forward by the actuator so as to generate brake-fluid pressure respectively in the rear fluid chamber and in the front fluid chamber; a rear inlet port and a rear outlet port formed in the rear fluid chamber, and connected respectively to the master cylinder and the wheel cylinders; a rear supply port formed at a rear of the rear inlet port so as to be adjacent to the rear inlet port, and connected to the master cylinder; a front inlet port and a front outlet port formed in the front fluid chamber, and connected respectively to the master cylinder and the wheel cylinders; a front supply port formed at a rear of the front inlet port so as to be adjacent to the front inlet port, and connected to the master cylinder; a first rear cup seal disposed at a front end of the rear piston so as to face forward; a second rear cup seal disposed at a rear end of the rear piston so as to face forward; a first front cup seal disposed at a front end of the front piston so as to face forward; a second front cup seal disposed at a rear end of the front piston so as to face rearward; a third front cup seal disposed forwardly of the second front cup seal of the front piston so as to be adjacent to the second front cup seal and to face forward; and a stopper which limits a distance by which the front piston can move backward.

Assuming a hypothetical case where, with the configuration described above, a failure of the electrically-driven hydraulic pressure generator occurs and makes the brake-fluid pressure generated by the master cylinder actuate the wheel cylinders, and where a failure of the first hydraulic system linked to the rear fluid chamber of the electrically-driven hydraulic pressure generator occurs and makes the first hydraulic system open to the atmosphere. In this case, the braking is carried out by the brake-fluid pressure of the second hydraulic system transmitted from the master cylinder to the wheel cylinders via the front fluid chamber of the electrically-driven hydraulic pressure generator. At this time, the forward-facing third front cup seal is disposed between the front supply port communicating with the master cylinder and the rear fluid chamber that has been opened to the atmosphere due to the discussed failure. In addition, the stopper limits the distance by which the rear piston can move backward. Accordingly, the third front cup seal can prevent the brake-fluid pressure generated by the master cylinder from leaking out via the front supply port and the rear fluid chamber. Concurrently, the stopper can prevent the front piston from being moved backward by the pressure in the front fluid chamber. What is secured, as a consequence, is the braking by the second hydraulic system linked to the front fluid chamber of the electrically-driven hydraulic pressure generator.

According to a second feature and aspect of the present invention, in addition to the first feature and aspect, an atmospheric chamber is formed between the second front cup seal and the third front cup seal of the front piston.

Assuming a hypothetical case where, with the configuration described above, the third front cup seal does not function properly by the reason that the third front cup seal has been left unattached, or any other reason. In this case, with the second feature and aspect of the present invention, the brake fluid pressure generated by the master cylinder in response to the pedal pressure on the brake pedal by the driver, leaks out to the atmospheric chamber, so that the stroke of the brake pedal gradually increases. Accordingly, the driver can recognize the malfunction of the third front cup seal, and thus the driver can take some measures to counter the problem before a failure of the first hydraulic system occurs and the back up by the second hydraulic system is needed.

According to a third feature and aspect of the present invention, in addition to the second feature and aspect, a relief valve is provided which opens when a pressure of a predetermined value or higher is generated in the atmospheric chamber.

With the third feature and aspect as described above, a relief valve is provided that opens when a pressure of a predetermined value or higher is generated in the atmospheric chamber. Accordingly, when the driver depresses the brake pedal and a brake-fluid pressure generated by the master cylinder becomes the predetermined value or higher, the relief valve is opened allowing the brake fluid to leak rapidly. As a consequence the stroke of the brake pedal increases rapidly. For this reason, the driver can recognize the malfunction of the third front cup seal with more certainty.

The above-described and other objects, characteristics, and advantageous effects will become apparent through the detailed description of present exemplary embodiments to be given with reference to the accompanying drawings.

BRIEF DESCRIPTION OF THE DRAWINGS

FIG. 1 is a hydraulic-circuit diagram of a vehicle brake system under normal operation.

FIG. 2 is a hydraulic-circuit diagram corresponding to FIG. 1 of the vehicle brake system under abnormal operation.

FIG. 3 is an enlarged diagram of an essential portion in FIG. 1.

FIG. 5 is a hydraulic-circuit diagram of a vehicle brake system under normal operation.

FIG. 6 is a hydraulic-circuit diagram corresponding to FIG. 5 of the vehicle brake system under abnormal operation.

FIG. 7 is an enlarged diagram of an essential portion in FIG. 5.

DESCRIPTION OF THE PRESENT EXEMPLARY EMBODIMENT

A first exemplary embodiment of the present invention will be described below based on FIGS. 1 to 3.

Figure 1:
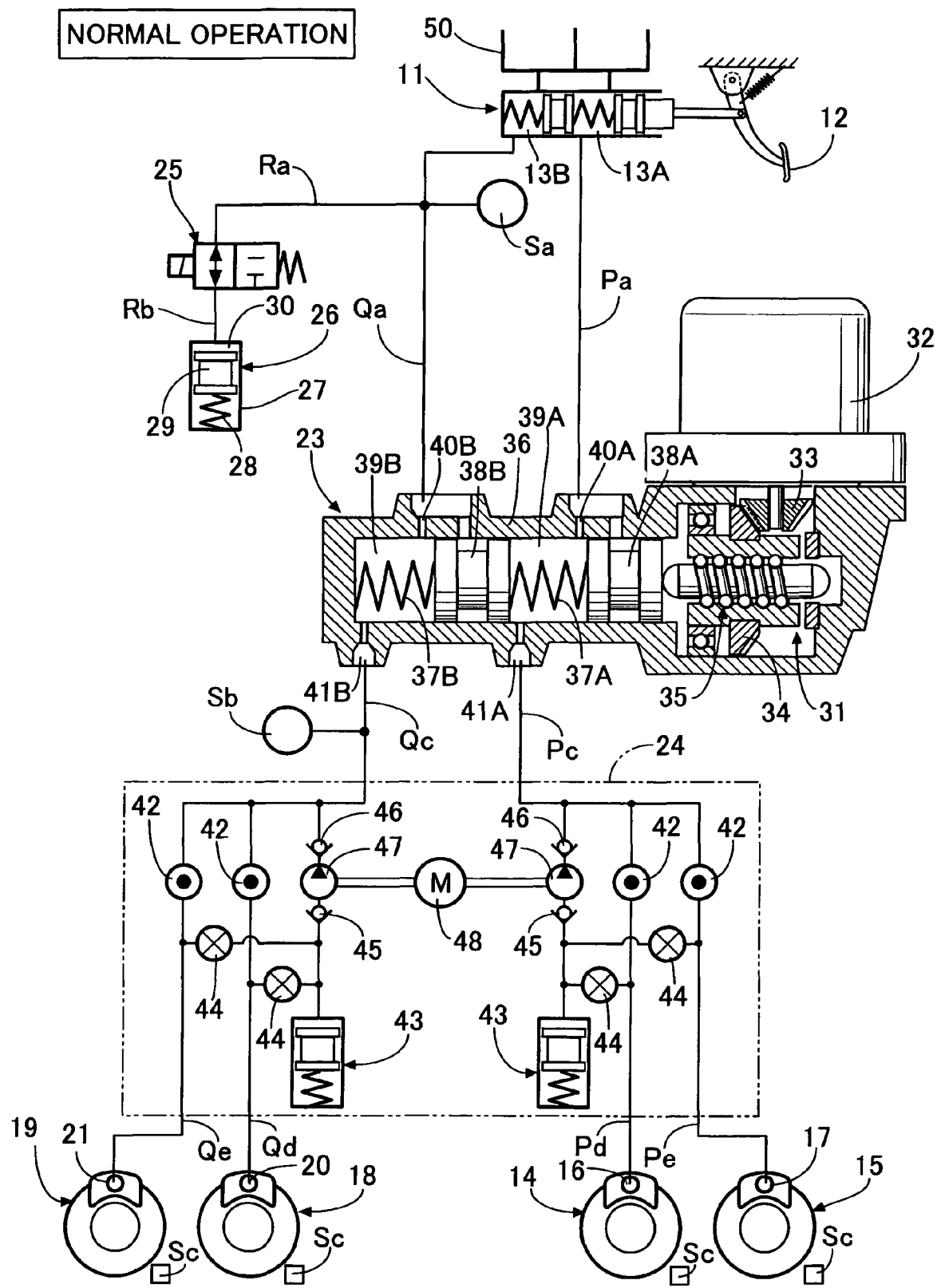
FIGS. 1 to 3 show a first exemplary embodiment of the present invention.

As FIG. 1 shows, a tandem master cylinder 11 includes first and second fluid chambers 13A and 13B, respectively, each outputting brake-fluid pressure corresponding to the pedal pressure on a brake pedal 12 by the driver. The first fluid chamber 13A is linked, for example, to wheel cylinders 16 and 17 of disc-brake units 14 and 15 of the front left and rear right wheels, respectively, via fluid passages Pa, Pc, Pd, and Pe. The second fluid chamber 13B is linked, for example, to wheel cylinders 20 and 21 of disc-brake units 18 and 19 of the front right and rear left wheels, respectively, via fluid passages Qa, Qc, Qd, and Qe.

A motor cylinder 23 is disposed between the fluid passages Pa and Pc, and between the fluid passages Qa and Qc. In addition, an anti-lock braking system (ABS) 24 is disposed in a position between the fluid passage Pc and the fluid passages Pd and Pe, and between the fluid passage Qc and the fluid passages Qd and Qe. Note that motor cylinder 23 in each of the exemplary embodiments corresponds to the electrically-driven hydraulic pressure generator of the present invention.

Fluid passages Ra and Rb which are branched from the fluid passage Qa are connected a stroke simulator 26 by a normally-closed electromagnetic valve that is a reaction force permissive valve 25. The stroke simulator 26 comprises a cylinder 27 and a piston 29 that is biased by a spring 28 and fitted into the cylinder 27 so as to slide freely. A fluid chamber 30 formed at the opposite side of the piston 29 with the spring 28, communicates with the fluid passage Rb.

An actuator 31 provided with the motor cylinder 23 includes: a drive bevel gear 33 provided on the output shaft of an electric motor 32; a driven bevel gear 34 that meshes with the drive bevel gear 33; and a ball screw mechanism 35 that is operated by the driven bevel gear 34. A pair of pistons 38A and 38B is disposed inside a cylinder main body 36 of the motor cylinder 23 so as to slide freely. Here, a pair of return springs 37A and 37B is provided to bias the respective pistons 38A and 38B in the backward direction. A rear fluid chamber 39A is formed at the front of the rear piston 38A while a front fluid chamber 39B is formed at the front of the front piston 38B.

Figure 3:
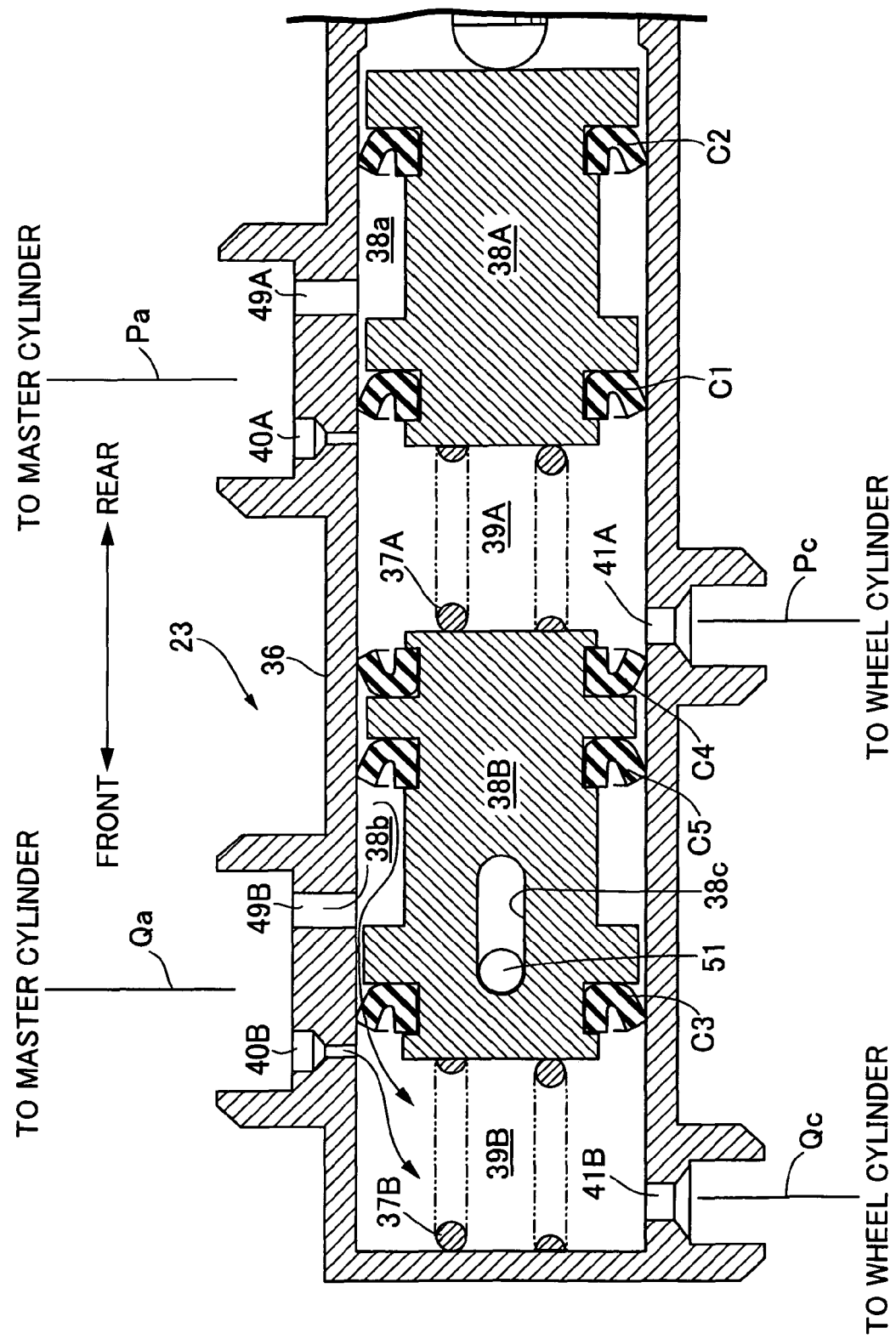

As FIGS. 1 and 3 clearly show, the rear fluid chamber 39A communicates with the fluid passage Pa via a rear inlet port 40A and a rear supply port 49A, and with the fluid passage Pc via a rear outlet port 41A. In addition, the front fluid chamber 39B communicates with the fluid passage Qa via a front inlet port 40B and a front supply port 49B, and to the fluid passage Qc via a front outlet port 41B.

A first rear cup seal C1 is provided to the front end portion of the rear piston 38A so as to face forward (i.e., so as to produce its sealing effects when the rear piston 38A moves forward), and a second rear cup seal C2 is provided to the rear end portion of the rear piston 38A so as to face forward. A first front cup seal C3 is provided to the front end portion of the front piston 38B so as to face forward, and a second front cup seal C4 is provided to the rear end portion of the front piston 38B so as to face backward (i.e., so as to produce its sealing effects when the front piston 38B moves backward). Further, a third front cup seal C5 is provided immediately before the front piston 38B so as to face forward.

In a middle portion of the rear piston 38A, a rear reservoir chamber 38a is formed between the first and the second rear cup seals C1 and C2, and communicates with the rear supply port 49A. In a middle portion of the front piston 38B, a front reservoir chamber 38b is formed between the first and the third front cup seals C3 and C5, and communicates with front supply port 49B.

As arranged between the forward-facing first rear cup seal C1 and the rearward-facing second front cup seal C4, the fluid tightness of the rear fluid chamber 39A is secured. In addition, the fluid leakage from the rear reservoir chamber 38a in a backward direction is prevented by the forward-facing second rear cup seal C2. The fluid tightness of the front fluid chamber 39B is secured by the forward-facing first rear cup seal C3. In addition, the fluid leakage from the front reservoir chamber 38b in a backward direction is prevented by the forward-facing third front cup seal C5.

In the front piston 38B, an elongate hole 38c is formed so as to extend in the front-to-rear direction, and a stopper 51 composed of a pin fixed to the cylinder main body 36 penetrates the elongate hole 38c so as to slide freely. The elongate hole 38c has a length that is long enough to avoid a contact with the stopper 51 while the motor cylinder 23 is operating normally. To put it differently, the length of the elongate hole 38c is set so that the stopper 51 within the elongate hole 38c does not obstruct required movement of the front piston 38B.

While the motor cylinder 23 is not operating, the first rear cup seal C1 of the rear piston 38A is positioned just behind the rear inlet port 40A. A slight forward movement of the rear piston 38A makes the first rear cup seal C1 pass by the rear inlet port 40A, and causes brake-fluid pressure to be generated in the rear fluid chamber 39A. In addition, while the motor cylinder 23 is not operating, the first front cup seal C3 of the front piston 38B is positioned just behind the front inlet port 40B. A slight forward movement of the front piston 38B makes the first front cup seal C3 pass by the front inlet port 40B, and causes brake-fluid pressure to be generated in the front fluid chamber 39B.

When the electric motor 32 is driven in one direction, the rear piston 38A and the front piston 38B move forward via the drive bevel gear 33, the driven bevel gear 34, and the ball screw mechanism 35. Immediately after the rear inlet port 40A and the front inlet port 40B respectively connected to the fluid passages Pa and Qa are closed, a brake-fluid pressure is generated in the rear fluid chamber 39A and in the front fluid chamber 39B, and then outputted to the fluid passages Pc and Qc through the rear outlet port 41A and the front outlet port 41B, respectively.

A structure of the ABS 24, as shown in FIG. 1, has been widely known. In the ABS 24, the system both for the disc-brake units 14 and 15 of the respective front left and rear right wheels has an identical structure to the system both for the disc-brake units 18 and 19 of the respective front right and the rear left wheels. As a representative example, the system for the disc-brake units 14 and 15 of the respective front left and rear right wheels is explained. A pair of in-valves 42, 42 each composed of a normally-open electromagnetic valve are disposed respectively between the fluid passages Pc and Pd, as well as between the fluid passages Pc and Pe. In addition, out-valves 44, 44 each composed of a normally-closed electromagnetic valve are disposed respectively between a reservoir 43 and the fluid passage Pd of a downstream side of the in-valve 42, as well as between the reservoir 43 and the fluid passage Pe of a downstream side of the in-valve 42. A hydraulic pump 47 which is located between a pair of check valves 45 and 46 is disposed between the reservoir 43 and the fluid passage Pc, and is driven by an electric motor 48.

An unillustrated electric control unit is provided to control the operation of the reaction force permissive valve 25, motor cylinder 23, and ABS 24. The electric control unit is connected to: a hydraulic pressure sensor Sa for detecting the brake-fluid pressure generated by the master cylinder 11; a hydraulic pressure sensor Sb for detecting the brake-fluid pressure to be transmitted to the disc brake units 18 and 19; and wheel speed sensors Sc for detecting the wheel speed of each wheel.

Next, the operation of the first exemplary embodiment of the present invention with the above-described configuration will be described.

While the system is operating normally, the reaction force permissive valve 25, composed of a normally-closed electromagnetic valve, is excited and thus is opened. When the hydraulic sensor Sa provided in the fluid passage Qa detects, under this condition, a pedal pressure on the brake pedal 12 by the driver, the actuator 31 of the motor cylinder 23 is actuated to make the rear piston 38A and the front piston 38B move forward, and thereby a brake-fluid pressure is generated respectively in the rear fluid chamber 39A and in the front fluid chamber 39B. The brake-fluid pressure then is transmitted, via the opened in-valves 42 of the ABS 24, to the wheel cylinders 16, 17, 20, and 21 of the respective disc-brake units 14, 15, 18, and 19 so as to brake their respective wheels.

A slight forward movement of the rear piston 38A and the front piston 38B of the motor cylinder 23 causes the rear inlet port 40A and the front inlet port 40B to close. The closing of the two inlet ports 40A and 40B disconnects the communication between the fluid passage Pa and the rear fluid chamber 39A, and the communication between the fluid passage Qa and the front fluid chamber 39B. Accordingly, the brake-fluid pressure that has been generated by the master cylinder 11 is not transmitted to the disc-brake units 14, 15, 18, and 19. Here, the brake-fluid pressure generated by the second fluid chamber 13B, which is the second one of the two fluid chambers 13A and 13B, in the master cylinder 11 is transmitted to the fluid chamber 30 in the stroke simulator 26 via the opened reaction force permissive valve 25, whereby the piston 29 moves against the spring force of the spring 28. As a consequence, the stroke of the brake pedal is permitted, and a pseudo pedal reaction force is generated so that an abnormal sensation that the driver would otherwise feel can be eliminated.

Then, the operation of the actuator 31 of the motor cylinder 23 is controlled in a way that the level of the brake-fluid pressure generated by the motor cylinder 23 and detected by the hydraulic pressure sensor Sb provided in the fluid passage Qc corresponds to the brake-fluid pressure generated by the master cylinder 11 and detected by the hydraulic pressure sensor Sa provided in the fluid passage Qa. Thereby, a braking force corresponding to the pedal pressure inputted to the brake pedal 12 by the driver can be generated in the disc-brake units 14, 15, 18, and 19.

During the above-described braking operation, when it is detected that an increased frequency of slip of any one of the wheels is causing the wheel to lock with a tendency, on the basis of the output of the wheel speed sensors Sc, the motor cylinder 23 is kept operating, and the ABS 24 is actuated to prevent the wheel from locking.

To be more specific, when a wheel tends to become locked, the respective in-valve 42 linked to the wheel cylinder of the disc-brake unit becomes opened, hence cutting off the transmission of the brake-fluid pressure from the motor cylinder 23. With the brake-fluid pressure being cut off, the brake-fluid pressure of the above-mentioned wheel cylinder is released to the reservoir 43 by opening the out-valve 44, that is, a pressure-reduction operation is carried out. Subsequently, the brake-fluid pressure of the wheel cylinder is maintained by closing the out-valve 44, that is, a maintaining operation is carried out. As a consequence, the braking force is lowered without the wheel being locked.

As a result, once the wheel speed is recovered enough to lower the slip ratio, the in-valve 42 is opened and the brake-fluid pressure of the wheel cylinder is increased, that is, a pressure-increase operation is carried out, and thus the braking force of the wheel is increased. If this pressure-increase operation again causes a tendency of the wheel to become locked, the above pressure-reduction operation, maintaining operation, and the pressure-increase operation will be carried out again. The repetition of these operations allows a maximum braking force to be generated while controlling the locking of the wheel. The brake fluid that has flown into the reservoir 43 during that time is returned by the hydraulic pump 47 to an upstream of the fluid passages Pc and Qc.

In the case where the motor cylinder 23 becomes incapable of operating as a result of a power-supply failure or the like, the braking operation is carried out by use of the brake-fluid pressure generated by the master cylinder 11 instead of the brake-fluid pressure generated by the motor cylinder 23.

Figure 2:
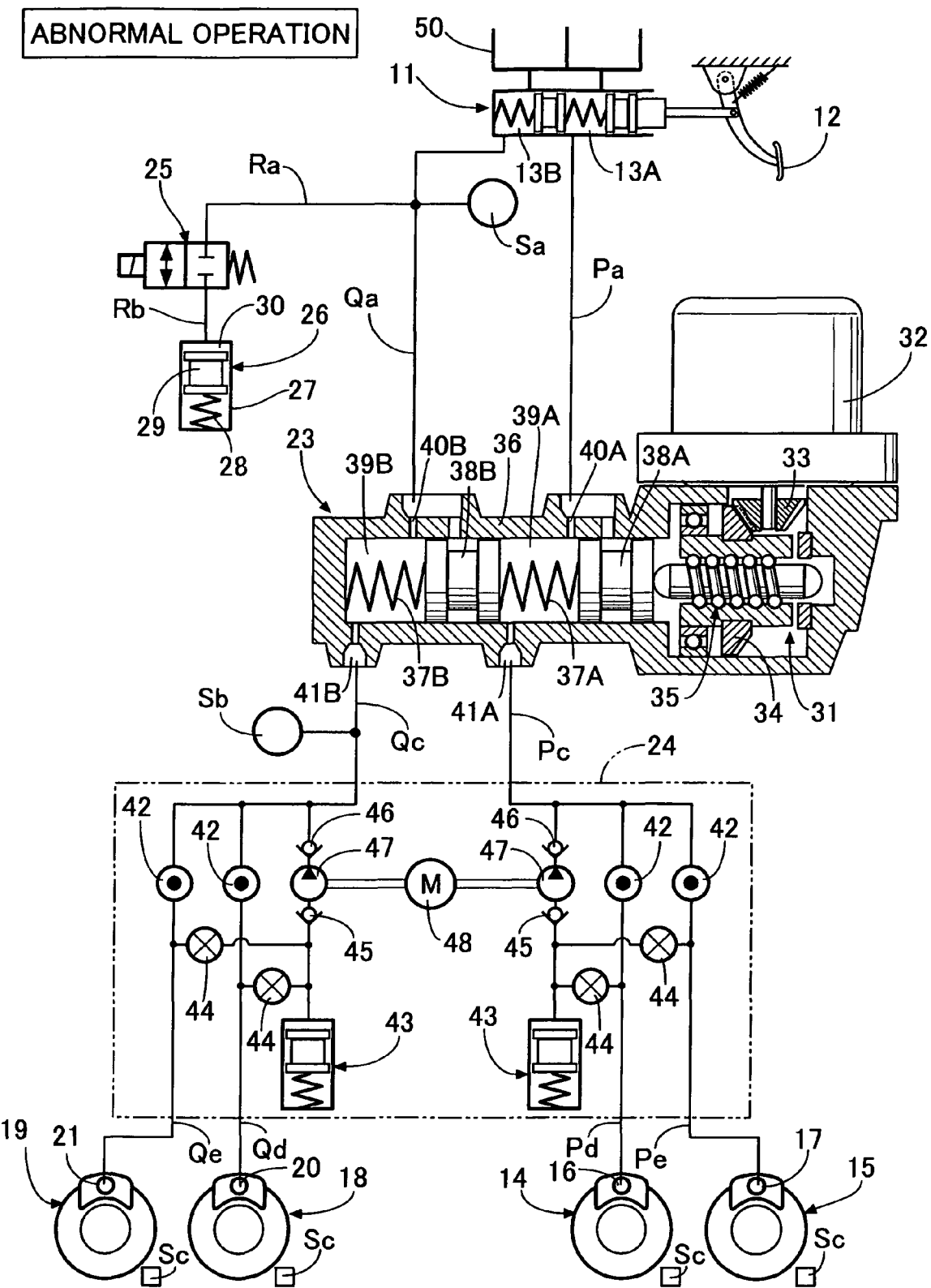

As FIG. 2 shows, when a power-supply failure or the like occurs, the reaction force permissive valve 25 composed of a normally-closed electromagnetic valve is automatically closed, while the in-valves 42 each composed of a normally-opened electromagnetic valve are automatically opened, and the out-valves 44 each composed of a normally-closed electromagnetic valve is automatically closed. In this state, the brake-fluid pressure generated in the fluid chambers 13A and 13B in the master cylinder 11 passes through the rear fluid chamber 39A and the front fluid chamber 39B in the motor cylinder 23 and the in-valves 42, without being absorbed by the stroke simulator 26. Thereafter, the brake-fluid pressure generated in the fluid chambers 13A and 13B in the master cylinder 11 actuates the wheel cylinders 16, 17, 20, and 21 of the respective disc-brake units 14, 15, 18, and 19. Accordingly, a braking force can be generated without any trouble.

Assuming hypothetically in the above-described abnormal case that the brake fluid leaks out when a failure occurs in the first hydraulic system that connects the first fluid chamber 13A in the master cylinder 11 to the wheel cylinders 16 and 17 of the disc-brake units 14 and 15 of the front left and rear right wheels respectively, via the fluid passage Pa, the rear fluid chamber 39A in the motor cylinder 23, the fluid passage Pc, the fluid passages Pd and Pe. In this case, braking force is generated in at least two of the four wheels by actuating the second hydraulic system that connects the second fluid chamber 13B in the master cylinder 11 to the wheel cylinders 20 and 21 of the disc-brake units 18 and 19 of the front right and rear left wheels respectively, via the fluid passage Qa, the front fluid chamber 39B in the motor cylinder 23, the fluid passage Qc, and the fluid passages Qd and Qe. As a consequence, a fail-safe function can be reliably activated.

Figure 4:
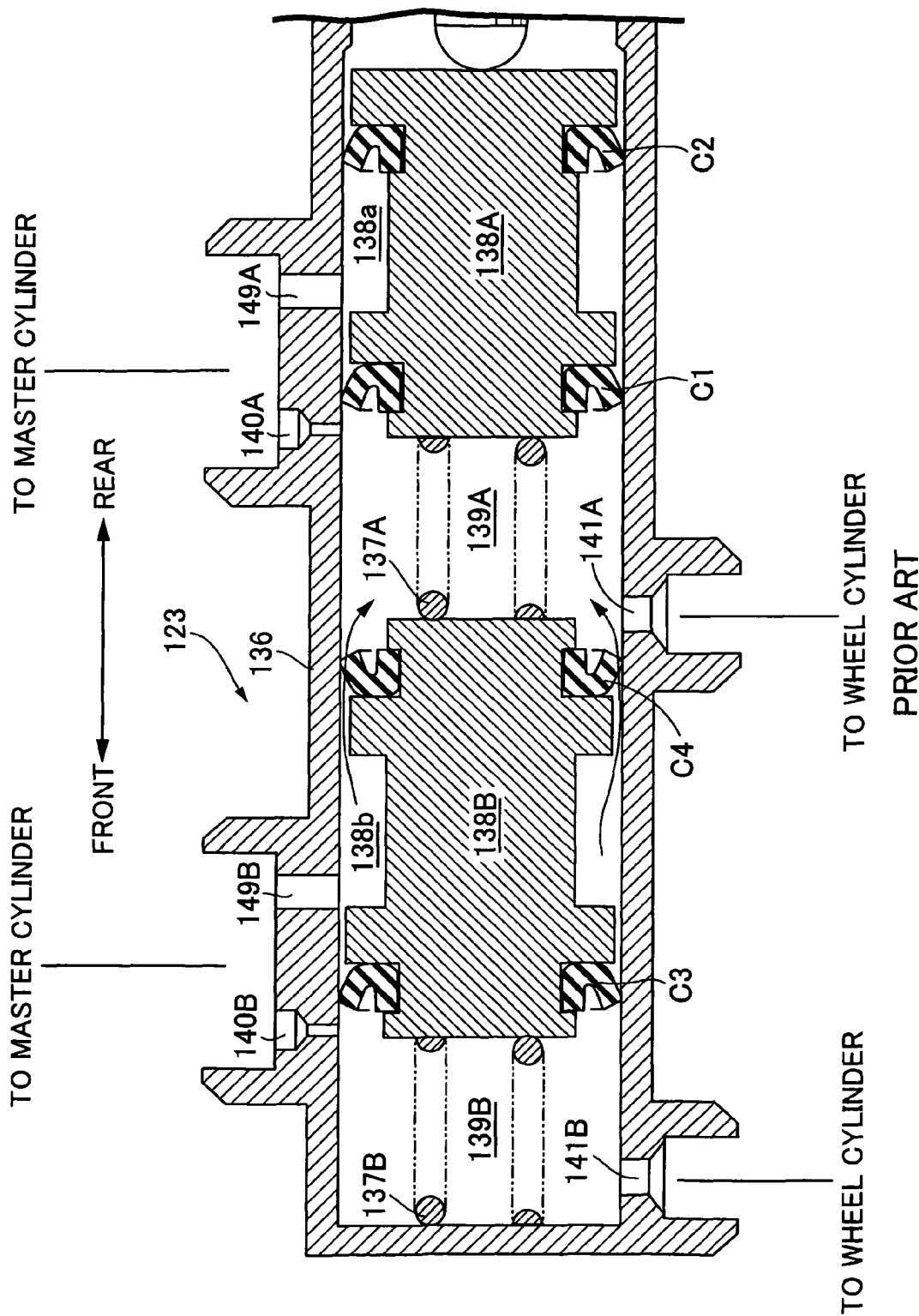
FIG. 4 is a diagram illustrating a conventional example of a portion similar to that of FIG. 3.

According to the conventional brake system shown in FIG. 4, the above-described hypothetical failure of the first hydraulic system causes the rear fluid chamber 39A in the motor cylinder 23 to be opened to the atmosphere, and thus the brake-fluid pressure having been generated in the second fluid chamber 13B in the master cylinder 11 may leak out in the path from the front supply port 49B to the fluid chamber 39A via the front reservoir chamber 38b and the second front cup seal C4. As a consequence, the second hydraulic system connected to the front fluid chamber 39B may also fail at the same time.

In the first exemplary embodiment shown in FIG. 3, however, even when the brake fluid is leaked out due to a failure of the first hydraulic system during abnormal operation, the brake-fluid pressure is transmitted from the second fluid chamber 13B in the master cylinder 11 to the front fluid chamber 39B and the front reservoir chamber 38b in the motor cylinder 23 via the fluid passage Qa. In this case, the communication between the front reservoir chamber 38b and the rear fluid chamber 39A that has been opened to the atmosphere is blocked by the third front cup seal C5. Accordingly, the brake-fluid pressure of the fluid chamber 39B is prevented from leaking out through the rear fluid chamber 39A. In addition, a backward movement of the front piston 38B is obstructed by the elongate hole 38c which is in contact with the front end of the stopper 51. Thereby, an unlimited increase in the capacity of the front fluid chamber 39B can be prevented from occurring. As a consequence, a brake-fluid pressure is generated normally in the front fluid chamber 39B, and the second hydraulic system linked to the front fluid chamber 39B will not fail together with the failure of the first hydraulic system.

Figure 5:
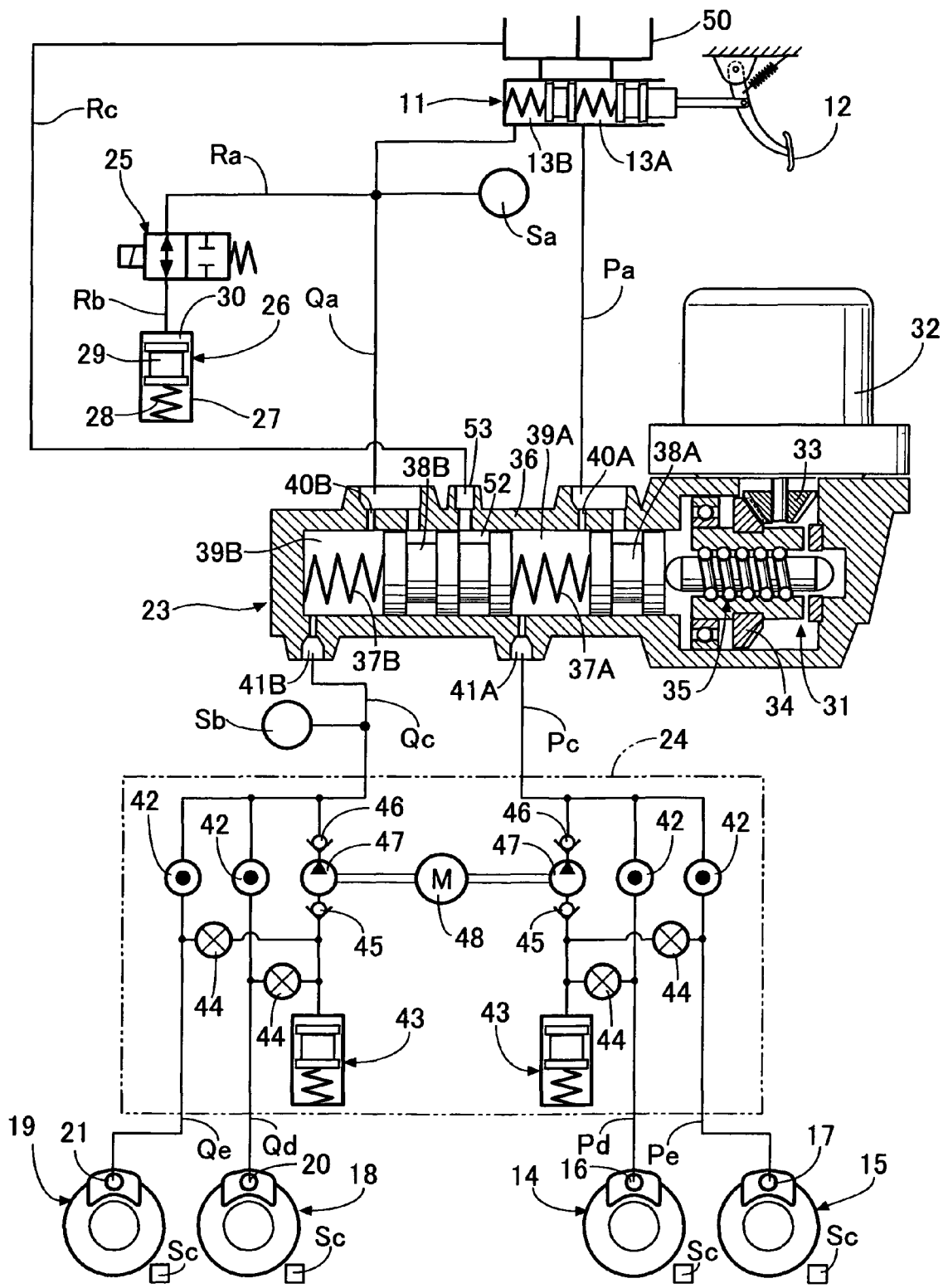
FIGS. 5 to 7 show a second examplary embodiment of the present invention.
Figure 6:
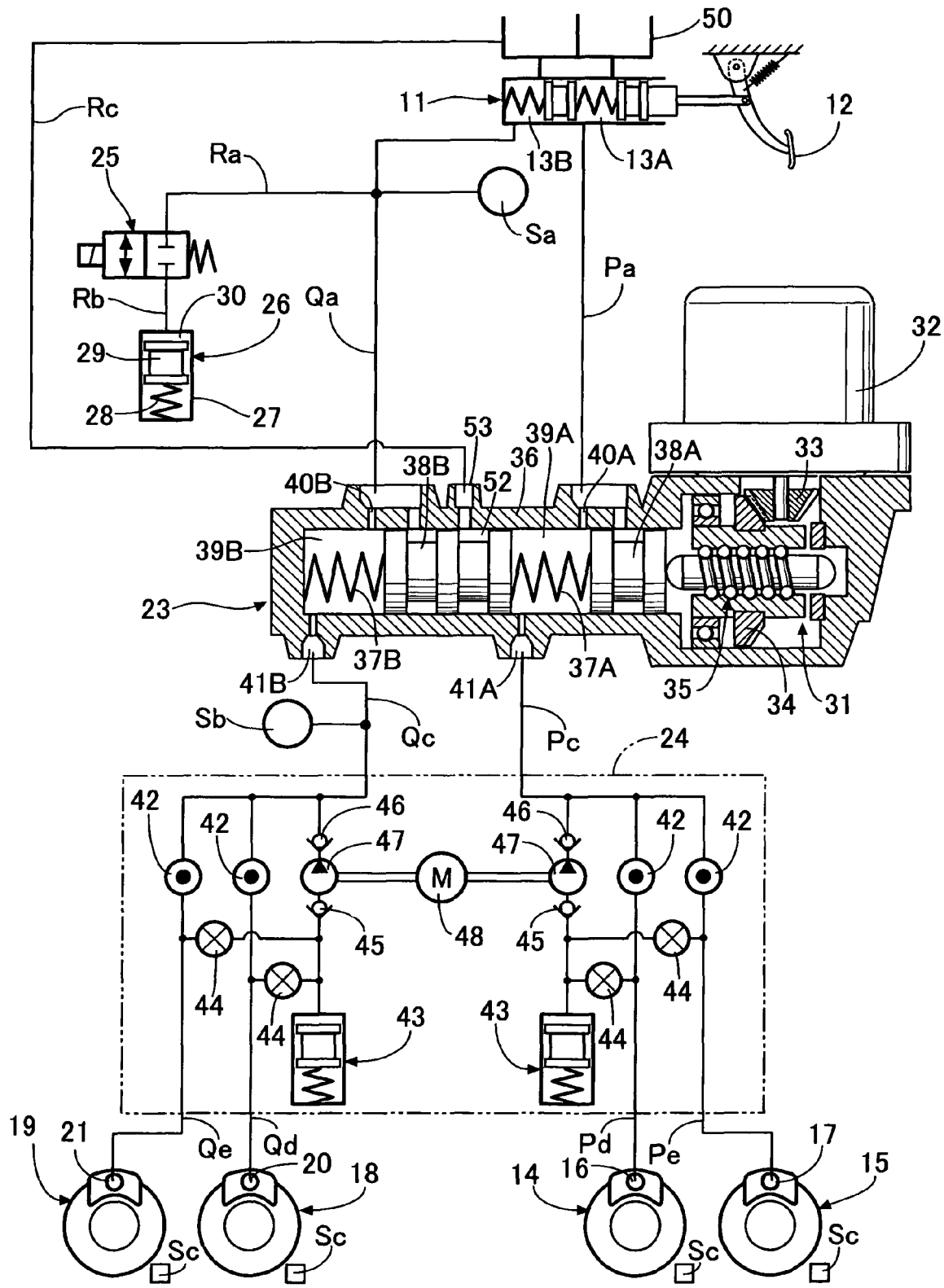
Figure 7:
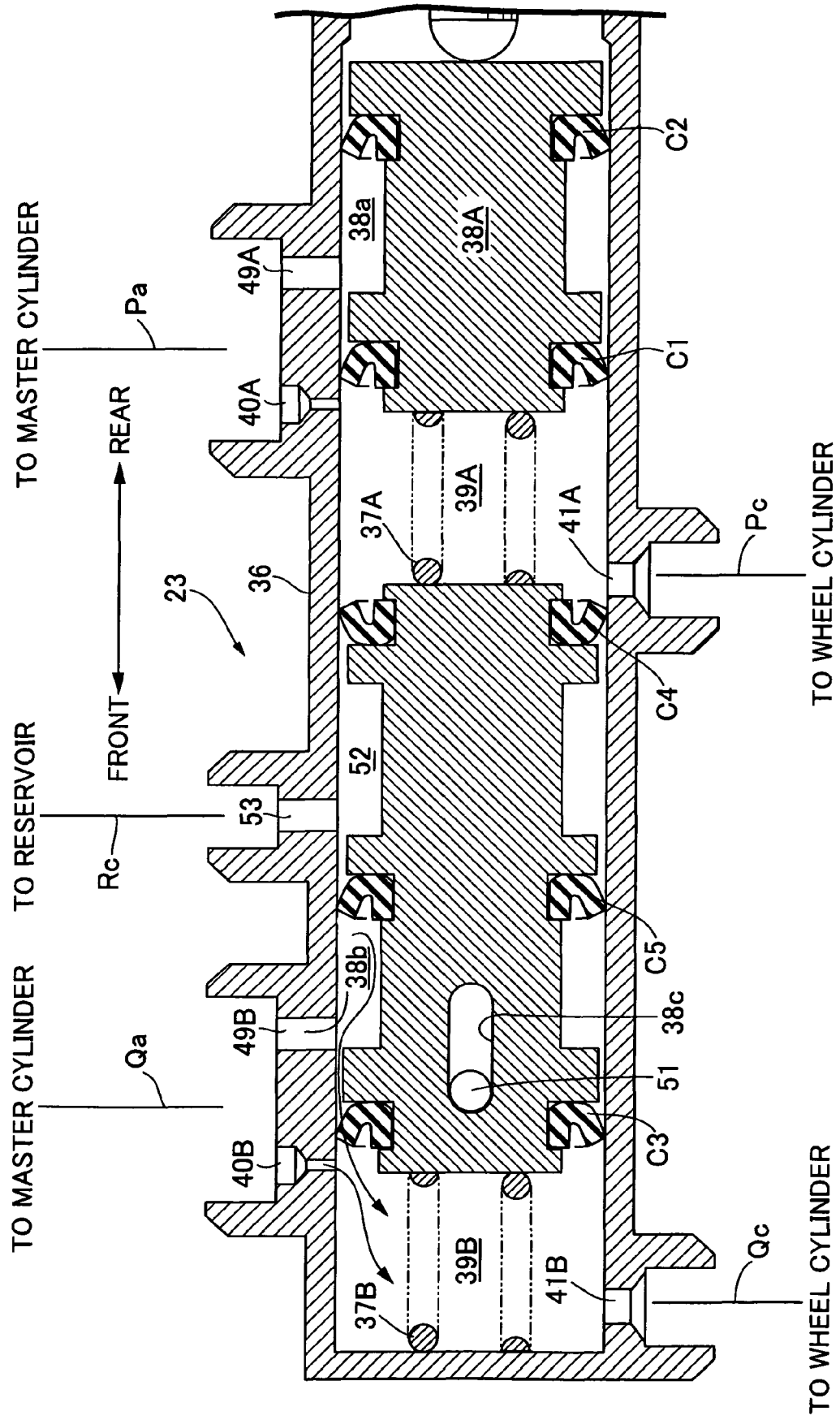

Incidentally, in the above-described brake system of the first exemplary embodiment, if the third front cup seal C5 is not attached in assembling, the driver cannot recognize the absence of the third front cup seal C5 until a failure actually occurs in the first hydraulic system. Accordingly, the braking by use of the second hydraulic system may not be secured because of the absence of the third front cup seal C5. A second exemplary embodiment of the present invention, which will be described below with reference to FIGS. 5 to 7, aims to solve the above-mentioned problem. Note that, the description of the second exemplary embodiment will be focused on the differences between the second exemplary embodiment and the first exemplary embodiment, and the description for the overlapping parts will be omitted.

In the second exemplary embodiment, an atmospheric chamber 52 is formed in the front piston 38B between the second front cup seal C4 and the third front cup seal C5, and is in communication with a reservoir 50 in the master cylinder 11 via an atmospheric port 53 and a fluid passage Rc.

In the above-described first exemplary embodiment, in a case where the third front cup seal C5 is inadvertently not attached during the assembling work of the motor cylinder 23 (or in a case where the third front cut cup seal C5 is damaged and loses its sealing ability), it is problematic that the malfunction/absence of the third front cup seal C5 is found out for the first time by recognizing the malfunction of a backup/failsafe system when a failure of the first hydraulic system occurs and the backup by the second hydraulic system is needed.

In contrast, in this second exemplary embodiment, the atmospheric chamber 52 is formed between the second front cup seal C4 and the third front cup seal C5 of the front piston 38B. For this reason, a part of the brake fluid sent from the fluid chamber 13B of the master cylinder 11 by the pedal pressure on the brake pedal 12 by the driver leaks out to the reservoir 50 via the fluid passage Qa, the front supply port 49B, the front reservoir chamber 38b, the unoccupied position where the third front cup seal C5 is supposedly attached to, the atmospheric chamber 52, and the liquid passage Rc, without being absorbed by the stroke simulator 26. As a consequence, the stroke of the brake pedal 12 is gradually increased by an amount corresponding to the leaked-out brake fluid. This allows the driver to reliably recognize the malfunction/absence of the third front cup seal C5, and thus the third front cup seal C5 can be installed/replaced before the backup is needed.

Other effects of the second exemplary embodiment are the same as those of the first exemplary embodiment described above.

Figure 8:
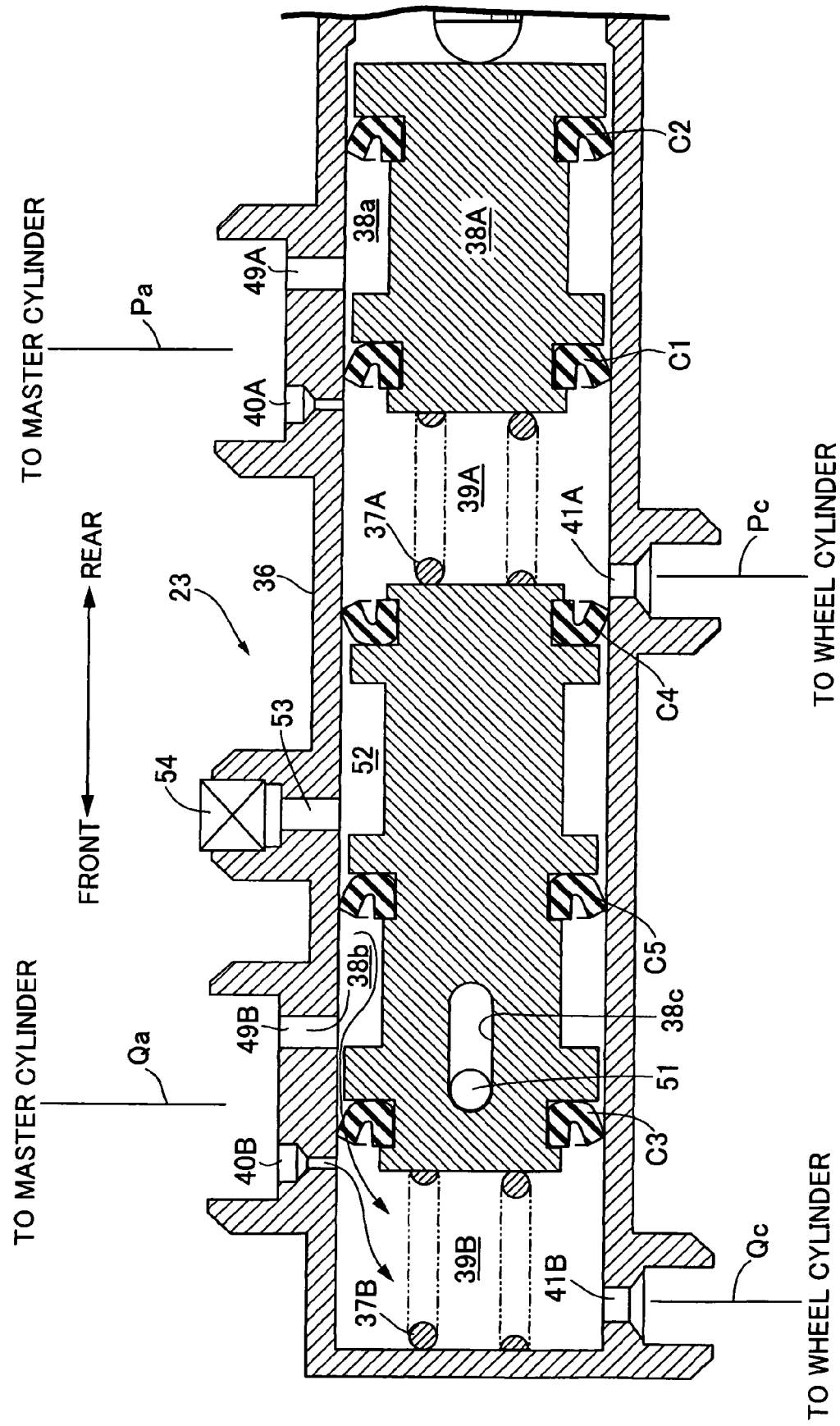
FIG. 8 is a diagram corresponding to FIG. 7 and illustrating a third exemplary embodiment of the present invention.

Next, a third exemplary embodiment of the present invention will be described with reference to FIG. 8.

The atmospheric chamber 52 of the second exemplary embodiment is communicated with the reservoir 50, but the atmospheric chamber 52 of the third exemplary embodiment is communicated with the atmosphere via a relief valve 54. When the driver depresses the brake pedal 12 so that the pressure generated in the fluid chamber 13B in the master cylinder 11 exceeds a predetermined value, the relief valve 54 is opened and the brake fluid leaks out rapidly. Thereby the stroke of the brake pedal 12 increases rapidly, and therefore, the driver is able to reliably recognize the malfunction of the third front cup seal C5.

Other effects of the third exemplary embodiment are the same as those of the second exemplary embodiment described above.

Although exemplary embodiments of the present invention have been described above, various modifications in design can be made thereto without departing from the scope of the present invention as set forth in the appended claims.

For example, the brake system of the above-described exemplary embodiments is provided with the ABS 24, but the present invention is applicable to a brake system without the ABS 24.

In addition, the stopper 51 is not limited to the one that engages with the elongate hole 38c of the front piston 38B, but any stopper with any appropriate structure can be employed.

What is claimed is:

1. A brake system comprising:
 a master cylinder which generates brake-fluid pressure in response to a braking operation of a driver;
 an electrically-driven hydraulic pressure generator which communicates with the master cylinder, includes a rear fluid chamber and a front fluid chamber, and generates, based on the driver's braking operation, brake-fluid pressure when driven by an electrically-controllable actuator; and
 a plurality of wheel cylinders which communicate with the rear fluid chamber and the front fluid chamber, respectively, and which generate a braking force to brake wheels,
 wherein when the electrically-driven hydraulic pressure generator fails, brake-fluid pressure generated by the master cylinder is used to actuate the wheel cylinders, and
 wherein the hydraulic pressure generator includes:
 a rear piston and a front piston which are moved forward by the actuator so as to generate brake-fluid pressure in the rear fluid chamber and in the front fluid chamber, respectively;
 a rear inlet port and a rear outlet port formed in the rear fluid chamber, and connected to the master cylinder and the wheel cylinders, respectively;
 a rear supply port formed at a rear of and adjacent to the rear inlet port, and connected to the master cylinder;
 a front inlet port and a front outlet port formed in the front fluid chamber, and connected to the master cylinder and the wheel cylinders, respectively;
 a front supply port formed at a rear of and adjacent to the front inlet port, and connected to the master cylinder so as to be supplied with brake fluid from the master cylinder;
 a first rear cup seal disposed at a front end of the rear piston so as to face forward;
 a second rear cup seal disposed at a rear end of the rear piston so as to face forward;
 a first front cup seal disposed at a front end of the front piston so as to face forward;
 a second front cup seal disposed at a rear end of the front piston so as to face rearward;
 a third front cup seal disposed forwardly of the second front cup seal of the front piston so as to be adjacent to the second front cup seal and to face forward; and
 a stopper which limits a distance by which the front piston can move rearward;
 wherein the electrically-driven hydraulic pressure generator causes the wheel cylinders to generate the braking force when the rear piston and the front piston are moved forward past the rear inlet port and the front inlet port, respectively;
 and wherein the front supply port is formed between the second front cup seal and the first front cup seal.

2. The brake system according to claim 1, wherein an atmospheric chamber is formed in the hydraulic pressure generator between the second front cup seal and the third front cup seal of the front piston.

3. The brake system according to claim 1, wherein the stopper includes a pin fixed to a main body of the hydraulic pressure generator and which penetrates an elongate hole formed in the first piston.

4. The brake system according to claim 1, further comprising a stroke simulator connected to a fluid passage extending from said master cylinder, and an electromagnetic valve disposed in said fluid passage, said electromagnetic valve permits said master cylinder to communicate with the stroke simulator during normal operation of the brake system and blocks communication between the master cylinder and the stroke simulator during abnormal operation of the brake system.

5. The brake system of claim 1, wherein said hydraulic pressure generator further comprises a main body in which said front and rear pistons are slidably disposed, and said electrically-controllable actuator is disposed at a rear part of the main body and operatively engages said rear piston.

6. The brake system of claim 1, further comprising an anti-lock braking system.

7. The brake system of claim 1, wherein the front supply port is formed between the third front cup seal and the first front cup seal.

* * * * *